Aug. 30, 1966  R. GERMERDONK ETAL  3,270,106
PROCESS FOR THE PRODUCTION OF A ROD-FORM SOLID FROM MOLTEN LOW MOLECULAR WEIGHT RIGID MATERIALS
Filed Dec. 10, 1964
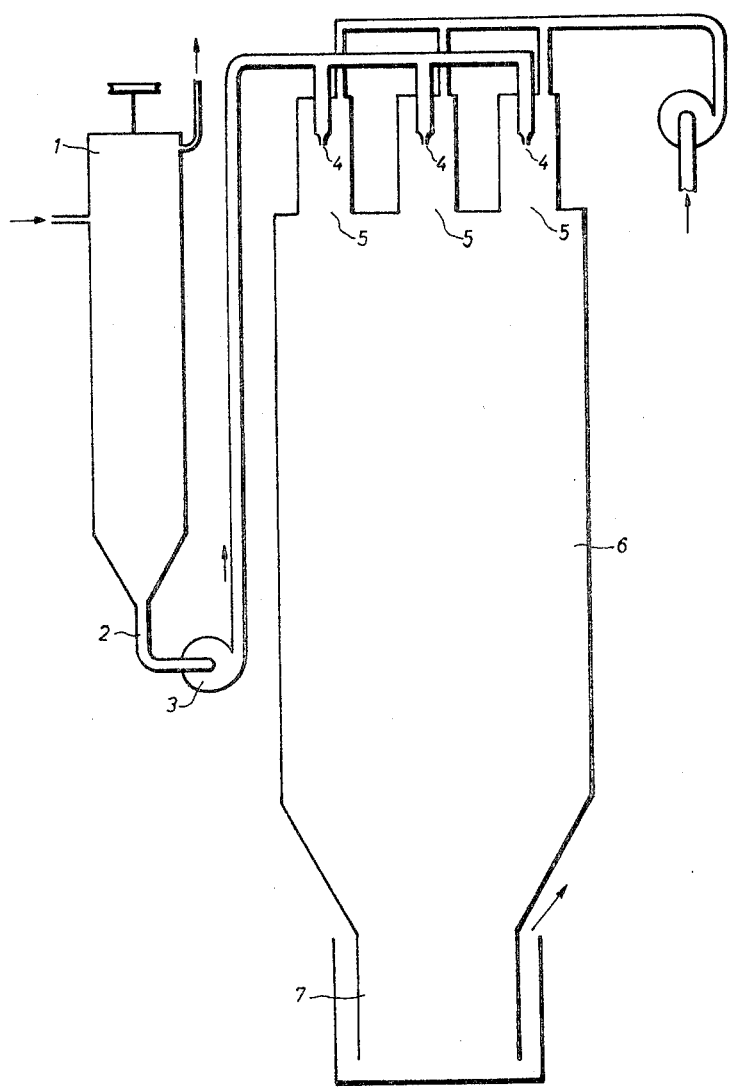
INVENTORS:
ROLF GERMERDONK, GERHARD PAULIG.
BY
ATTORNEY

United States Patent Office 3,270,106
Patented August 30, 1966

3,270,106
PROCESS FOR THE PRODUCTION OF A ROD-FORM SOLID FROM MOLTEN LOW MOLECULAR WEIGHT RIGID MATERIALS
Rolf Germerdonk, Schildgen, and Gerhard Paulig, Leverkusen, Germany, assignors to Farbenfabriken Bayer Aktiengesellschaft, Leverkusen, Germany, a corporation of Germany
Filed Dec. 10, 1964, Ser. No. 417,464
Claims priority, application Germany, Dec. 17, 1963, F 41,563
2 Claims. (Cl. 264—143)

The invention relates to a process for the production of a rod-form solid from molten low molecular weight rigid materials which form a melt that solidifies only slowly but is viscous.

Low molecular weight rigid materials which are manufactured in the form of solutions or melts, may be converted into small solid particles by a number of known processes, including spray-drying and concentration by evaporation (in the case of solutions), followed by solidification on drums, belts or in tanks. In addition, it is known that viscous plastics can be extruded into strands (optionally at high temperature and pressure) which are subsequently cut into small pieces. There are also a number of granulation processes by means of which particles with sizes of an order of magnitude of mm. may be prepared from dry dusts after moistening.

If a solvent-free viscous melt of a low molecular weight rigid substance only solidifies slowly, cooling on belts or drums is often difficult because the product has not solidified completely by the time it reaches the point of removal, and consequently sticks. On the other hand, however, such melts are often so highly liquid that known extrusion methods cannot be employed because, on leaving the strainer, the liquid coalesces into fairly large drops. In such instances, it is preferred to employ spray-drying or solidification in tanks (followed by grinding), but the solid product will then contain fine dust which is undesirable, particularly where hygroscopic or biologically active materials are concerned.

These disadvantages are obviated in accordance with the invention by pressing the melt through nozzles, superficially solidifying the resulting, suspended melt filaments of large diameter in a first cooling section by means of a coolant flowing parallel to the filaments and at a slightly different speed, so that they no longer coalesce into drops under the effect of surface tension. The filaments, thus stabilized, are then internally solidified by means of a random flow of coolant and, finally, are broken into pieces.

In the first cooling section, the liquid filament issues freely from a nozzle and is dimensionally stabilized by loss of heat. Unlike the high molecular weight filaments processed by known fibre-spinning processes, this filament is not very strong on account of its large diameter (e.g., 1 mm.). The removal of heat is effected by means of a stream of cooling gas which is not very turbulent, is guided parallel to the filaments and has a flow velocity differing only slightly from the speed at which the filament leaves the nozzle. A suitable speed difference, for example, is 0.4 m./sec. when the Reynold's number of the gas flow in the tube is 1500. The dimensional stabilization of the liquid filament is promoted if the flow velocity of the cooling gas is less than the speed at which the liquid filament moves. The heat may be dissipated from the filament more rapidly by evaporation cooling or by radiation cooling. The first stage of cooling is completed when the filament which is still liquid internally ceases to coalesce into drops under the effect of surface tension.

In the second cooling section, the filament is internally solidified. The filaments may be further cooled by a random flow of cooling gas, for example, in a dropping shaft. Final solidification of the already partly solidified, and hence non-tacky, filaments may even be effected after they have gathered in a heap, through which a cooling gas may be passed.

The process is particularly suitable for use with melts which, because of their viscosity, may readily be processed into filaments which may be cooled by a stream of cold air or inert gas, for example, phenyl-α-naphthylamine, N-isopropyl - N' - phenyl-p-phenylene diamine, benzyl phenol, diphenylamine, masked isocyanates (phenyl urethanes), phenoxyacetic acids and phenoxy propionic acids, optionally substituted in the phenyl radical, such as 2,4-dichlorophenoxyacetic acid, 2-methyl-4 - chlorophenoxyacetic acid and 2 - methyl-4-chlorophenoxypropionic acid and their alkali metal salts, thiono phosphoric acid esters and their derivatives, phenol-formaldehyde resins, polyester resins, and pure or co-condensation products of naphthalene sulphonic acids and phenols with formaldehyde.

Example

The herbicide, sodium-2,4-dichlorophenoxy propionate (2,4-DP), is manufactured in the form of aqueous solutions. On spray-drying or drum-drying it forms fine powders which clot very readily when stored, because of the hygroscopic properties of 2,4-DP, and which may damage crops because of the dust which they give off in the preparation of solutions for use on agricultural land. If 2,4-DP is dehydrated in an evaporator, a viscous melt is obtained which solidifies slowly when cooled below its setting point. The 2,4-DP which is solidified in tanks, for example, may be ground but in this instance, too, some of it accumulates in the form of a fine dust.

The single figure of the accompanying drawing shows an apparatus by means of which a dust-free solid can be produced in rod form from an aqueous 2,4-DP solution by the process described above. Because a rod has a smaller specific surface than a fine powder, this solid seems less hygroscopic in handling and, in spite of this, is readily soluble in water for the preparation of the solutions for application because, unlike a powder, the rods do not clot when placed in water.

The aqueous 2,4-DP solution may be concentrated by evaporation, for example, in a thin-film evaporator 1 to a water content of less than 1% by weight. The 2,4-DP melt leaving the outlet 2 at approximately 150° C. is delivered to the nozzles 4 by means of a pump 3. The nozzles have a bore diameter of 1 mm. and the 2,4-DP melt flows vertically downwards through each nozzle at approximately 2.5 kg./hr. Each of the nozzles 4 is arranged concentrically in a tube 5 which has a diameter of 60 mm. and a length of approximately 300 mm. Dry air at a temperature of 20° C. is fed to each of the tubes 5 at 3 to 5 nm.$^3$/hr. All the tubes 5 open into a dropping shaft 6 with a height of approximately 12 m. The 2,4-DP filaments which are still liquid on leaving the nozzles 4, are cooled in the tubes 5 to such an extent that they cannot coalesce into drops (first cooling section). The filaments are then further cooled in the dropping shaft 6 (second cooling section), so that they form a non-tackey ad dimensionally stable heap in the collector 7. On completion of solidification, the filaments are so rigid that they can be broken into 10–30 mm. bars by repeated compression of the filament heap contained in a bag or sack.

We claim:
1. A process for the production of a rod-form, dust-free solid in a dropping shaft, from molten low molecular weight rigid materials that form a melt which solidifies only slowly but is viscous wherein the melt is pressed through nozzles and the resulting, suspended melt filaments of large diameter are superficially solidified in a first cooling section by means of a coolant flowing parallel to the filaments at a slightly different speed, so that they no longer coalesce into drops under the effect of surface tension, and the filaments thus stabilized are internally solidified in a second cooling section by a random flow of coolant and, finally, are broken into pieces.

2. A process as claimed in claim 1, wherein the flow velocity of the coolant flowing parallel to the liquid filaments in the first cooling section, is lower than the velocity of the filament.

References Cited by the Examiner
UNITED STATES PATENTS

| | | | |
|---|---|---|---|
| 2,975,483 | 3/1961 | Cooper et al. | 264—176 |
| 3,067,458 | 12/1962 | Dauchert | 264—176 |
| 3,135,811 | 6/1964 | Barnett et al. | 264—176 |

FOREIGN PATENTS 12,850/33  4/1934  Australia.

ROBERT F. WHITE, *Primary Examiner.*
S. HELLER, *Assistant Examiner.*